July 9, 1963   V. W. MELIKIAN   3,097,077
FRUIT DRYING TRAY
Filed Jan. 11, 1960
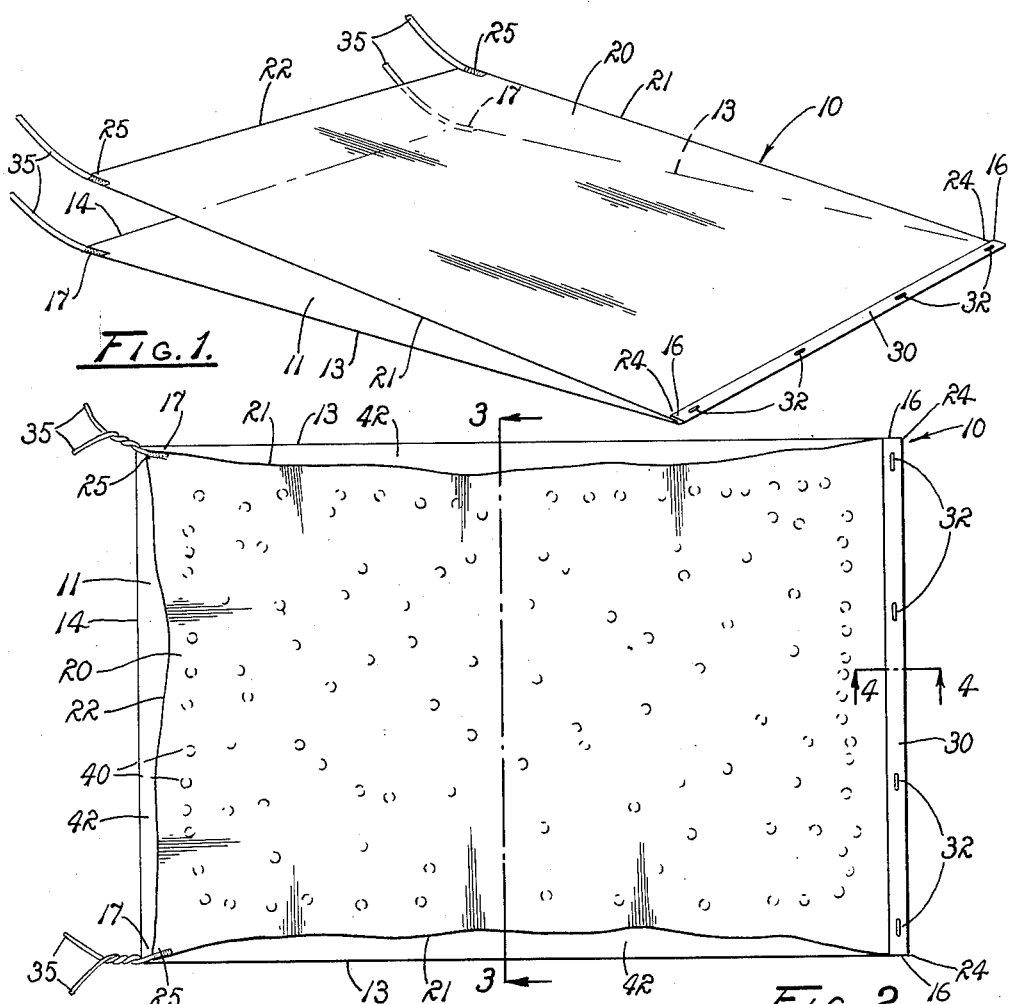
VAUGHN W. MELIKIAN
INVENTOR
HUEBNER & WORREL
ATTORNEYS
BY Richard M. Worrel United States Patent Office 3,097,077
Patented July 9, 1963

3,097,077
FRUIT DRYING TRAY
Vaughn W. Melikian, 5138 N. Van Ness, Fresno, Calif.
Filed Jan. 11, 1960, Ser. No. 1,514
4 Claims. (Cl. 34—93)

The present invention relates to a fruit drying tray and more particularly to such a tray adapted to receive fruit thereon for exposure to the sun and which is conducive to improved cleanliness and faster drying of the fruit.

It has long been the practice to dry fresh fruits by the natural rays of the sun. Freshly picked grapes, for example, are laid on trays between the rows of grape vines and exposed to the sun for several days or weeks, as weather conditions may require. The grapes are usually turned during the dry process in an effort to obtain substantially uniform drying and coloring of the grapes. Both paper and wooden trays have been employed for the purpose.

While the sun-drying of fruits is more popular and economical than dehydration by artificial means, it exposes the fruits to the hazards of early fall rains, insects, dust and debris, and the like, and has other disadvantages which will subsequently be discussed. The damaging of raisins, for example, by abnormally early rains results in a form of decay, referred to as mold, which can virtually destroy an entire crop. While the processes and machines for cleaning dried fruits of mold, insects, dust, debris and the like are numerous and well-known, such cleaning is not as desirable as the initial minimizing or avoiding of such contamination.

Accordingly, it is an object of the present invention to provide an improved fruit drying tray.

Another object is to provide an improved tray adapted for the sun-drying of fresh fruits, which tray aids in the drying process while protecting the fruit during drying thereof.

Another object is to minimize loss incident to abnormally early rains during the season for drying of fresh fruits.

Another object is to protect drying fruits from insects, dirt and debris, and other contaminants.

Another object is to provide a fruit drying tray of improved durability.

Another object is to minimize the formation of mold on dried fruits during the drying process.

Another object is to provide a fruit drying tray which, while minimizing the need for turning the fruits dried thereby, makes it easier to turn the fruits when required.

Another object is to provide a re-usable tray of sheet material.

Another object is to provide a fruit drying tray which is economical to make and to use, and which is highly effective for accomplishing its intended purposes.

These, together with other objects, will become more fully apparent upon reference to the following description and accompanying drawing.

In the drawing:

FIG. 1 is a perspective view of a fruit drying tray embodying the principles of the present invention.

FIG. 2 is a somewhat enlarged, top plan view of the tray of FIG. 1 shown with a quantity of grapes to be dried within the tray.

FIG. 3 is a still further enlarged, transverse section taken on line 3—3 of FIG. 2 and also showing grapes within the tray.

FIG. 4 is a somewhat enlarged, fragmentary section taken on line 4—4 of FIG. 2.

Referring more particularly to the drawing, a fruit drying tray embodying the principles of the present invention is generally indicated by the numeral 10. The tray includes a flexible, rectangular bottom panel 11 of moisture-repellent sheet material having a pair of spaced parallel longitudinal edges 13 and a pair of spaced parallel transverse edges 14 and 15 interconnecting the longitudinal edges and defining therewith a pair of fold corners 16 and an opposite pair of free corners 17. It has been found that kraft paper similar to that conventionally employed in paper raisin drying trays is excellently suited for use as the material for the bottom panel. Alternatively, a double-strength, water-resistant, kraft paper may be employed as the material for the bottom panel for greater durability and moisture resistance.

The tray 10 also includes a substantially rectangular, transparent, flexible cover panel 20 of sheet material substantially the same size as the bottom panel 11. The cover panel has a pair of longitudinal edges 21, a pair of transverse edges 22 and 23, and fold and free corners 24 and 25, respectively. The cover panel is preferably made of a polyethylene film having a thickness of about two to six mils. Paper which has been oiled or waxed to substantial transparency and for water resistance can also be employed for the cover panel.

An outer flap 30 adjacent to the transverse edge 15 of the bottom panel 11 is reversely folded toward the transverse edge 15. An inner flap 31 adjacent to the transverse edge 23 is similarly reversely folded toward the transverse edge 22 of the cover panel 20. The inner flap of the cover panel is fitted underneath the outer flap so that the longitudinal edges 21 of the cover panel are extended along corresponding longitudinal edges 13 of the bottom panel when the cover panel overlays the bottom panel. Also, when in said overlaid relation, the transverse edge 22 is substantially coincident with the transverse edge 14.

Staples 32 are extended through the interfitted flaps 30 and 31 of the bottom and cover panels 11 and 20 thereby to interconnect the bottom and cover panels for hinging or folding movement between a fruit drying position with the cover panel overlaying the bottom panel in substantially congruent relation therewith, and a fruit exposing position with said cover panel folded backwardly from the bottom panel. While staples have been illustrated and described herein as the means for interconnecting the cover and bottom panels, any suitable means can be utilized. For example, the panels can be interconnected by a bonding cement, glue or by heat vulcanization.

Elongated flexible ties 35 are individually connected to the free corners 17 and 25 of the bottom and cover panels 11 and 20. The ties on corresponding free corners of the panels are intertwined or twisted together, as illustrated in FIG. 2, in the fruit drying position of the panels thereby to hold the panels together in said position. Alternatively, the cover panel is extended in overlaying relation to the transverse edge 14 of the bottom panel 11 and tucked under the bottom panel along said transverse edge 14.

Operation

The operation of the described embodiment of the subject invention is believed to be readily apparent and is briefly summarized at this point.

A plurality of the trays 10 are placed on the ground between rows of vines in a grape vineyard, for example, in substantially the same manner as conventional paper drying trays. With the ties 35 separated, the cover panel 20 of each tray is folded backwardly and laid on the ground in substantially coplanar relation with the bottom panel 11. Bunches of freshly picked grapes 40 are then laid on the bottom panel so as substantially to cover the same, as illustrated in FIG. 2.

The cover panel 20 is then folded downwardly over the grapes 40 on the bottom panel 11. Corresponding ties 35 are twisted together as illustrated in FIG. 2, to hold the cover panel over the grapes. It is evident that with the grapes stacked on the bottom panel, the grapes hold the cover panel upwardly away from the bottom panel so that corresponding vertically spaced, longitudinal and transverse edges 13, 21, 14 and 22 provide ventilation openings 42 therebetween.

Grapes 40, for example, are dried more quickly in the tray 10 of the subject invention because heat is captured between the panels 11 and 20 and because of the reflective action of the light rays between the panels. Further, grapes in the subject tray are ventilated by passage of air through the openings 42. Moisture and the vapors from the drying grapes are allowed to escape through the same openings.

It is evident from the foregoing that the subject tray enables the drying of fresh fruits in a highly sanitary manner. The tray protects the drying fruits against the direct action of falling rain and thereby minimizes the formation of mold on the fruit. Further, the bottom panel serves as a barrier to protect the fruit from moisture in the ground. Of course, the cover and bottom panels, when tied together, serve to project the drying fruits from many contaminants such as insects, dirt, and debris. With the cover panel tied down to the bottom panel, the grapes are held on the bottom panel in neatly stacked relation. This allows placing of more fruit on the bottom panel with a minimum of spilling of the fruit from the edges of the bottom panel. Since the panels are flexible, when the fruit has dried and the stack thereof has reduced in vertical dimension, the panels can be rolled with the dried fruit therein following a procedure similar to that conventionally employed. However, because of the superior covering afforded by the tray of the present invention, rolling is not required. Because of the improved and safer drying conditions afforded by the subject tray and its durability permitting use over several years, adoption of trays embodying the subject invention is an economy in the drying of fruits notwithstanding the relatively greater initial cost of the subject trays as compared with conventional trays.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A tray for sun drying freshly picked fruits comprising a pair of substantially rectangular cover and bottom panels of flexible sheet material each having a pair of longitudinally spaced, substantially parallel transverse edges interconnected by a pair of transversely spaced, substantially parallel longitudinal edges, both of said panels being water-repellent and said cover panel being transparent; means foldably interconnecting a transverse edge of the cover panel to a transverse edge of the bottom panel; and means releasably tying the opposite transverse edges of the panels together at spaced positions therealong whereby openings are provided between opposed longitudinal edges of opposite panels and between said opposite transverse edges to permit passage of air between the panels when they are tied together, wherein the material of the bottom panel is kraft paper.

2. A tray for sun drying freshly picked fruits comprising a pair of substantially rectangular cover and bottom panels of flexible sheet material each having a pair of longitudinally spaced, substantially parallel transverse edges interconnected by a pair of transversely spaced, substantially parallel longitudinal edges, both of said panels being water-repellent and said cover panel being transparent; means foldably interconnecting a transverse edge of the cover panel to a transverse edge of the bottom panel; and means releasably tying the opposite transverse edges of the panels together at spaced positions therealong whereby openings are provided between opposed longitudinal edges of opposite panels and between said opposite transverse edges to permit passage of air between the panels when they are tied together, wherein the longitudinal and transverse edges of each of the panels meet in corners of the panels opposite to the foldably interconnected edges; and wherein said tying means comprises elongated flexible tie members individually connected to said corners, the ties on adjacent corners of the opposite panels being twisted together to interconnect the panels.

3. The tray of claim 1 wherein the bottom panel is folded over the cover panel along said interconnected edges; and wherein said interconnecting means comprises a plurality of staples extended through said bottom and cover panels where the bottom panel is folded over the cover panel.

4. A fruit drying tray comprising a bottom panel of flexible, moisture resistant sheet material adapted for horizontal positioning on the ground in a flattened condition to receive fruit disposed thereon for drying purposes; a top panel of transparent sheet material adapted to be moved to a fruit drying position overlying the fruit and the bottom panel in substantially congruent relation with the bottom panel having the fruit thereon, and being adapted to transmit radiant heat therethrough and being of a sufficient flexibility at least partially to conform to the fruit by reason of gravitational force, the bottom panel being of a flexibility less than said top panel and sufficiently rigid to support the fruit resting thereon; said panels having respective joining segments and respective edges in circumferentially spaced relation to the joining segments; means interconnecting the joining segments of the edges of the panels for movement of the top panel between a fruit drying position and a fruit exposing position retracted from the drying position; and means releasably interconnecting the bottom and cover panels at a position along their respective edges in circumferentially spaced relation to the joining segments, the panels providing openings between said interconnecting means and the joining segments for allowing passage of ventilating air currents between the panels for ventilating fruit being dried in the tray.

References Cited in the file of this patent

UNITED STATES PATENTS

| | | |
|---|---|---|
| 1,300,670 | Stevens | Apr. 15, 1919 |
| 1,683,447 | Conger | Sept. 4, 1928 |
| 2,728,515 | Haire | Dec. 27, 1955 |
| 2,836,339 | Pringle | May 27, 1958 |